March 22, 1955 G. A. KWASNIEWSKI 2,704,799
VARIABLE RESISTORS FOR AIRCRAFT INSTRUMENTS
Filed May 31, 1951 5 Sheets-Sheet 1

FIG. 1

INVENTOR.
GEORGE A. KWASNIEWSKI
BY
George H. Fisher
ATTORNEY

FIG. 3

INVENTOR.
GEORGE A. KWASNIEWSKI
BY
*George H Fisher*
ATTORNEY

Fig. 5

United States Patent Office 2,704,799
Patented Mar. 22, 1955

2,704,799

VARIABLE RESISTORS FOR AIRCRAFT INSTRUMENTS

George A. Kwasniewski, Moundview Township, Ramsey County, Minn., assignor to Minneapolis-Honeywell Regulator Company, Minneapolis, Minn., a corporation of Delaware Application May 31, 1951, Serial No. 229,234

2 Claims. (Cl. 201—62)

This invention relates to the field of aircraft instruments, and particularly to such instruments as are designed to give to the human pilot of an aircraft visual indication of the value of one or more conditions of flight of the craft.

Because of the increasingly crowded condition of aircraft instrument panels it is becoming important to combine indications in a single instrument, where this can be done without loss of intelligibility. It is also becoming more prevalent to abandon conventional meter type instruments, substituting instruments whose form, outline, or nature of operation portray or suggest to the human pilot the variable being indicated, without conscious identifying effort on his part.

It is the primary object of the present invention to provide an improved indicator in which a number of indicating and control functions are performed within a single housing, and in which the visual indications are such as to identify the conditions being indicated at a glance and to give assurance that the conditions are of the proper values without requiring determination of what the values actually are.

More specific objects of the invention are to provide an indicator having a pair of parallel, normally vertical, spaced scales with indexes on each side of each scale, the indexes adjacent one scale giving scheduled and actual values of one condition and the indexes adjacent the other scale giving selected and actual values of another condition; to arrange the indexes so that when either pair is alined, the actual value of the condition is that selected regardless of the numerical magnitudes of the values; to construct the indexes so that the two conditions can be distinguished at a glance; to combine in one housing the indicating functions and at least one function of supplying an electrical signal proportional to each indication; and to adjust the indicator so that the electrical signals will have a desired correlation for a desired relation of the indexes on the scales; and to provide at least one electrical signal which is determined jointly by the position of the two indexes associated with one of the scales.

Various other objects, advantages, and features of novelty which characterise my invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which I have illustrated and described a preferred embodiment of my invention.

Figure 4:
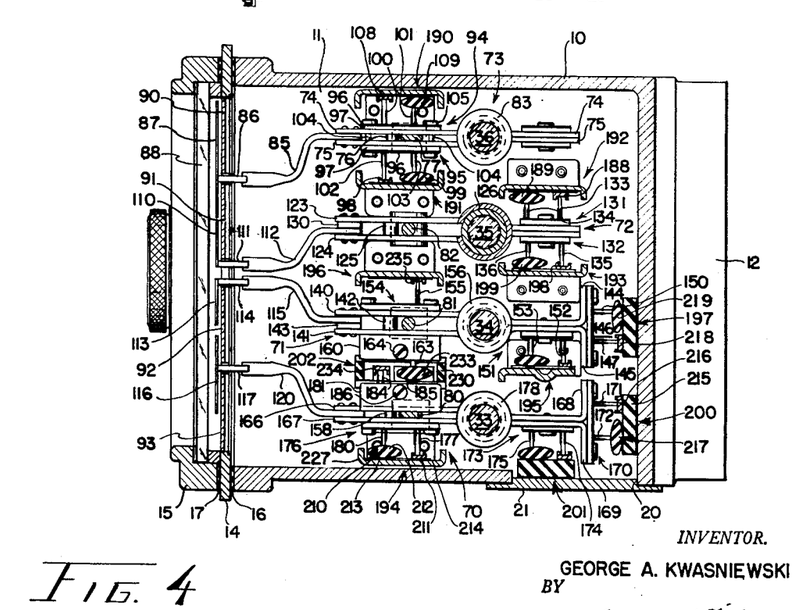
Figure 4 is a sectional view taken along the line indicated by the numerals 4—4 in Figure 3.

My indicator is shown to comprise a housing 10 having a principal instrument chamber 11 and upper and lower gear boxes 12 and 13. The open front portion of the housing is closed by an adapter plate 14 and a front cover 15, suitable sealing gaskets 16 and 17 being also provided. As best shown in Figure 4, an aperture 20 formed in one side of housing 10 is closed by a cover 21.

Figure 2:
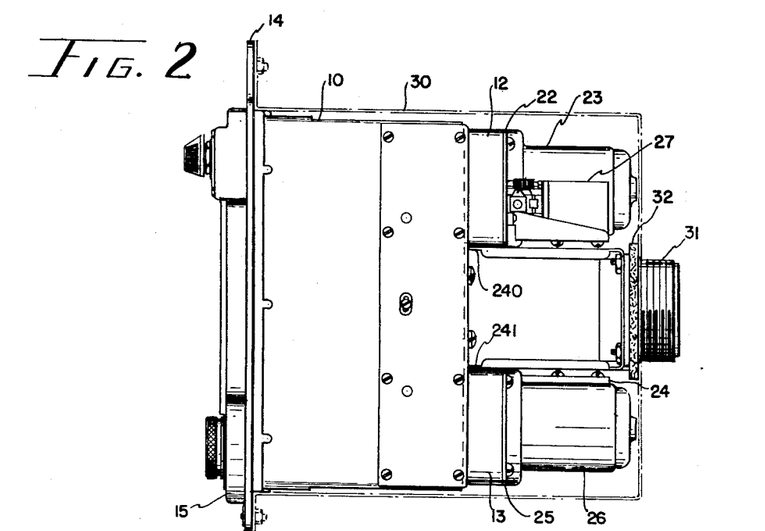
Figure 2 is a side view of the instrument on a reduced scale.

Figure 2 shows that gear box 12 is closed by a cover 22 carrying an A. C. motor 23 and a D. C. motor 27 whose shafts pass through the cover and into the gear box. Similarly gear box 13 is provided with a cover 25 carrying an A. C. motor 26 and a D. C. motor 24. The entire instrument behind adapter plate 14 is enclosed in a dust cover 30 which is apertured to pass a multiple pin connector 31 against which it is sealed by a gasket 32.

Figure 3:
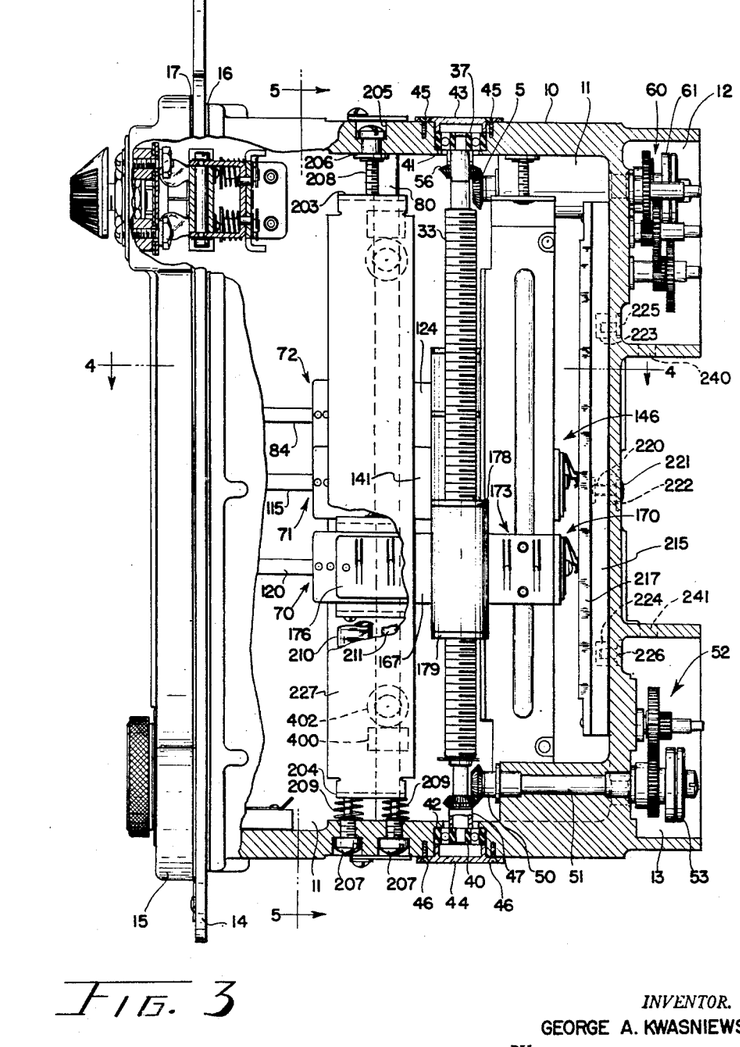
Figure 3 is a view similar to Figure 2 on the scale of Figure 1, with portions of the instrument broken away.

Mounted in housing 10 are a row of threaded shafts or jackscrews 33, 34, 35 and 36. In Figure 3, jackscrew 33 is shown as carried between bearings 37 and 40 mounted in recessed openings 41 and 42 machined in the top and bottom of housing 10, and held in position by shields 43 and 44 fastened to the housing by machine screws 45 and 46. The other jackscrews are similarly mounted.

At its lower end, jackscrew 33 carries a bevel gear 47, which meshes with a second bevel gear 50 carried by a shaft 51 passing through housing 10 into gear box 13. Shaft 51 is driven by motor 26 through a gear train 52 which includes a friction clutch 53. In the same way jackscrew 35 carries at its lower end a bevel gear 54 which is driven through a bevel gear 55 and associated gearing in gear box 13 from motor 24.

At its upper end jackscrew 34 carries a bevel gear 56 which meshes with a further bevel gear 57. The shaft carrying beveled gear 57 extends into gear case 12, and is driven by motor 27 through gear train 60 which includes a friction clutch 61. In like fashion jackscrew 36 carries at its upper end a bevel gear 62 which meshes with a further bevel gear 63. Gear 63 is driven by motor 23 through gearing in gear box 12 including a friction clutch arrangement.

Figure 5:
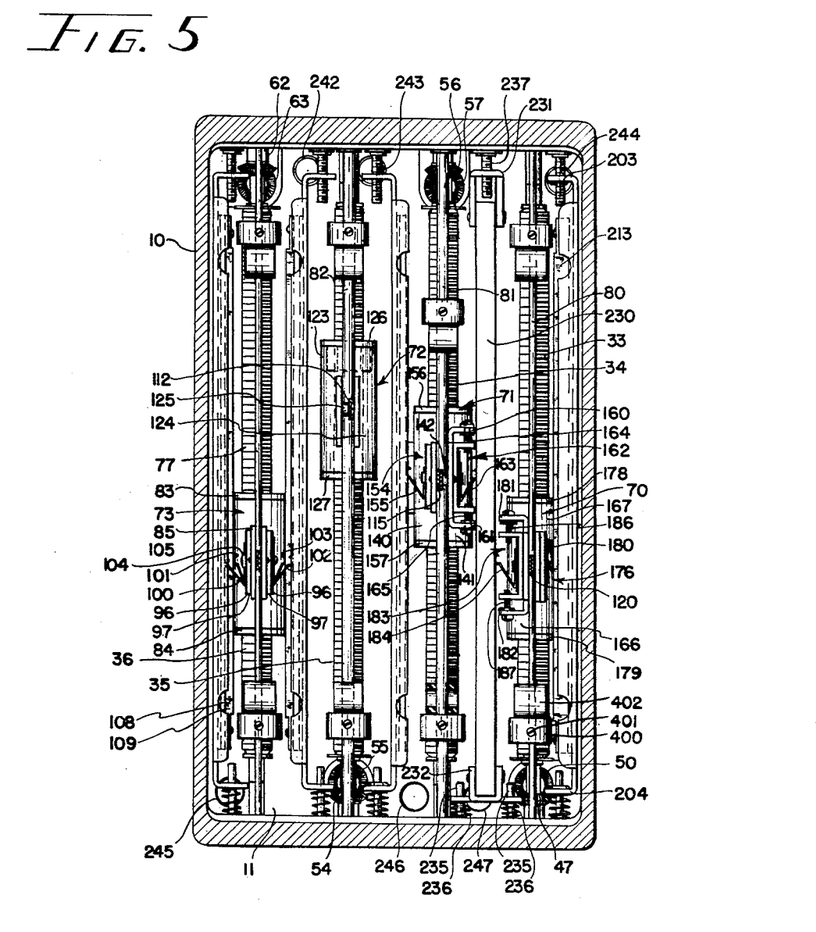
Figure 5 is a vertical section taken along the line 5—5 of Figure 3.

In threaded engagement with jackscrews 33, 34, 35 and 36 are a like number of carriages 70, 71, 72 and 73 respectively. For the sake of economy the main portion of each carriage is built up of a number of parts, rather than being machined from solid metal. Thus carriage 73 is shown in Figures 4 and 5 to comprise a pair of straps 74 and 75 having relatively narrow forward and rearward portions, and relatively broad central portions, the latter being arched to surround jackscrew 36. The rearward portions of straps 74 and 75 are directly spot welded together, and the forward portions are separated by a spacer 76 and then secured together. The length of spacer 76 is the same as the thickness of a guide rod 77, which acts to prevent carrier 73 from rotating when jackscrew 36 is rotated, but permits the carriage to move longitudinally along the jackscrew. Guide rods 80, 81, 82 are provided for carriages 70, 71 and 72, as best seen in Figure 5.

When straps 74 and 75 are assembled as described above, a substantially cylindrical opening appears between them, and into this opening a pair of bushings 83 and 84 are pressed and silver-soldered for additional security. After assembly, a thread is chased through the two bushings to receive the jackscrew.

Riveted at the forward end of carriage 73 is an index carrier 85 having an opening at its forward end to receive the stem 86 of a pitch attitude index 87. Index 87 is visible through a transparent window 88 in cover 15, and as carriage 73 is displaced along jackscrew 36, stem 86 moves upwardly and downwardly in the space between a blank scale plate 90 and a graduated pitch attitude scale plate 91. These scale plates, and two further scale plates 92 and 93, are mounted on adapter plate 14 by any suitable means such as machine screws 89.

Figure 1:
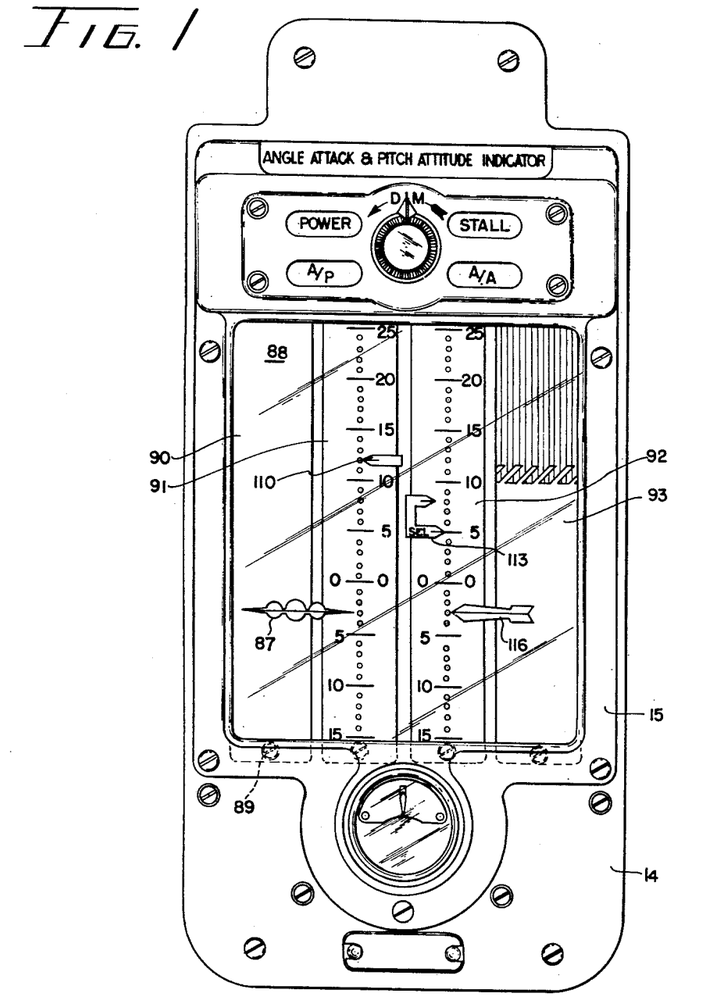
Figure 1 is a face view of the instrument.

Scale plate 92 carries the scale of attack angle, and an index 116 is so constructed as to overlie that scale and also a portion of plate 93. It is known that for any particular aircraft, there is an attack angle at which stalling of the craft takes place regardless of airspeed, pitch attitude, load, etc. The indicator shown in Figure 1 is for use with a craft which stalls at an attack angle of 12 degrees, and the portion of plate 93 above 12 degrees in scale plate 92 is colored red. The portion of plate 93 between 12 degrees and 10 degrees is diagonally hatched in red to indicate a danger area.

Whenever the craft's attack angle exceeds 10 degrees, index 116 is seen by the pilot against a hatched background to warn him that he has selected an attack angle dangerously close to stall. When the attack angle of the craft becomes still greater so that the craft stalls, index 116 is seen by the pilot against a solid red background, to give visual indication that the craft is stalling. Stalling may occur, during dives, for example, under conditions which make its presence less than normally obvious, and indication of stall provided in the present apparatus is of special utility in this connection.

Mounted on opposite sides of but insulated from carrier 73 are a pair of slider assemblies 94 and 95. Each assembly includes a mounting plate 96, insulated from the adjacent strap by an insulating plate 97, and carrying sets of flexible contacts. The assemblies are held to carriage 73 by rivets 104 whose heads are insulated from mounting plates 96 by bushings 105 of insulating material. Contacts 100 and 101 are carried by slider assembly 94, and contact members 102 and 103 are carried by slider assembly 95.

From the structure just described it will be apparent that as motor 23 operates, carriage 73 moves upward and downward along jackscrew 36, and that this results in movement of index 87 up and down with respect to scale 91. At the same time movable contacts 100, 101, 102 and 103 are moved upwardly and downwardly with respect to components fixed in the housing to comprise a pair of variable voltage dividers, as will presently be described.

Just as index 87 is associated with carriage 73, so a second index 110 is connected by a stud 111 and a carrier 112 to carriage 72. Similarly an index 113 is connected by a stud 114 and a carrier 115 to carriage 71, and index 116 is connected by a stud 117 and a carrier 120 to carriage 70.

Studs 111 and 114 both travel in the space between scale plates 91 and 92. It will thus be apparent that any movement of carriage 72 or carriage 71 about the axis of its respective jackscrew is liable to result in mechanical interference between indexes 110 and 113 as they are moved up and down along their respective scales. To avoid this, guide rods 82 and 81 are of considerably greater cross-section than guide rods 95 and 80, where motion of this sort can more readily be tolerated.

Carriage 72 is shown to comprise a pair of jack straps 123 and 124 spot welded together at their rearward ends, and fastened together with an inserted spacer 125 at their forward ends. The mechanical connection between jackscrew 35 and carriage 72 is through threaded bushings 126 and 127, and a spacing member 130 is included in the connection between carriage 72 and carrier 112.

Slider assemblies 131 and 132 are carried on carriage 72 in a fashion described in connection with carriage 73, except that they are located on the rearward portion of the carriage rather than on the forward portion, to permit obvious economy of space. Assembly 131 includes sets of contacts 133 and 134, and assembly 132 includes sets of contacts 135 and 136.

Carriage 71 includes a pair of jack straps 140 and 141 spot welded together at their rearward portions, and fastened together at their forward portions with a spacer 142. A member 143 provides the necessary spacing at the point of connection of carrier 115. The connection between carriage 71 and jackscrew 34 includes a pair of threaded bushings 156 and 157.

Jack straps 140 and 141 have oppositely extending rearward extensions 144 and 145 respectively, to serve as a mounting for a slider assembly 146 including a first set of contacts 147 and a second set of contacts 150. A further slider assembly 151 carried on the rearward portion of carriage 71 includes a first set of contacts 152 and a second set of contacts 153. The forward portion of carriage 71 includes a slider assembly 154 including a single set of contacts 155.

Jack strap 141 has upper and lower outward extremities 160 and 161, and slidable in the space between these extensions is a gib 162 which insulatingly supports a set of contacts 163. Gib 162 is moved along jack strap 141 by a captive screw 164, and its movement is controlled by a pair of guide screws 165.

Carriage 70 is shown to comprise a pair of jack straps 166 and 167 spot-welded together at their rearward ends, and connected together at their forward ends through a spacer 158. The connection between jackshaft 33 and carriage 70 includes upper and lower threaded bushings 178 and 179.

At their rearward ends jack straps 166 and 167 are provided with opposite extensions 168 and 169 to provide a mounting for a slider assembly 170 including a first set of contacts 171 and a second set of contacts 172. Mounted on the rearward portion or carriage 70 there is also a further slider assembly 173 including a first set of contacts 174 and a second set of contacts 175.

Mounted on the forward portion of carriage 70, is a slider assembly 176 including a first set of contacts 177 and a second set of contacts 180. Jackstrap 166 is extended to form upper and lower ledges 181 and 182, between which is slidably mounted a gib 183 insulatingly carrying a first set of contacts 184 and a second set of contacts 185. Adjustment of gib 183 with respect to jack strap 166 is accomplished by means of a captive screw 186, and the motion is guided by a pair of guide screws 187.

The purpose of the various sets of contacts heretofore described is to comprise portions of a number of voltage dividers used to supply electrical signals to remote controlling or indicating portions of an aircraft. To this end there are provided a number of resistance assemblies which will now be described. Thus resistance assembly 190 cooperates with contacts 100 and 101 of carriage 73, and resistance assembly 191 cooperates with contacts 102 and 103 of carriage 73. Resistance assembly 192 cooperates with contacts 133 and 134 of carriage 72, and resistance assembly 193 cooperates with contacts 135 and 136 of carriage 72. Resistance assembly 194 cooperates with the contacts 177 and 180 of carriage 70. Each of resistance units 190, 191, 192, 193 and 194 is shown to comprise a bracket insulatingly carrying a resistance winding and a collector strip, as is most clearly illustrated in connection with unit 194. Bracket 227 of this unit is shown to have upper and lower mounting lips 203 and 204, the former threaded to receive a screw 208 held captive in a recess 205 in top of housing 10 by a spring washer 206, and the latter drilled to pass the reduced portions of a pair of guide screws 207: a pair of compression springs 209 are interposed between bracket 227 and the bottom of housing 10.

Bracket 227 carries a resistor 210 and a collector strip 211. Resistor 210 comprises an elongated bobbin 212 of elliptical cross section upon which there has been placed a winding 213 of resistance wire. Collector strip 211 comprises a strip of a metal having a high wear resistance. such as Nichrome, and is of sufficiently large cross sectional area to have negligible resistance. A channel is formed in one side of the collector strip, as shown in Figure 4. Resistor 210 and collector strip 211 are insulatingly mounted on bracket 227 by suitable means including a thin strip 214 of insulating material and such rivets and insulating bushings as are necessary. When properly assembled in a complete unit, as is also shown in Figure 4, contacts 180 engage the winding on resistor 210, and contacts 177 move in the groove in collector strip 211. Adjustment of screw 208 is effective to displace the entire winding longitudinally of the housing with respect to the sliders, and thus to adjust the position of the sliders 180 on the winding 213 corresponding to any particular position of carriage 70 along jackscrew 33, and hence of index 116 with respect to scale 90.

Resistance assembly 195, cooperating with contacts 152 and 153 of carriage 71, is essentially the same as the units just described, but for structural reasons the configuration of the bracket of this unit is slightly different.

There is also provided an assembly 196 similar to the assemblies just described except that it has no resistance winding, is but only a collector strip 235 cooperating with slider 155 of carriage 71.

Resistance assembly 197 cooperates with contacts 150 and 147 of carriage 71, resistance assembly 200 cooperates with contacts 171 and 172 of carriage 70, and resistance assembly 201 cooperates with sliders 174 and 175 of carriage 70. These resistance units are of identical construction, and unit 200 will be used as an example. This unit is shown to comprise a strip 215 of insulating material to which are fastened in any suitable fashion a collector strip 216 like strip 211, and a resistor 217 like resistor 210. Strip 215 is provided with internally threaded means 220 for engagement by a screw 221 passing through an elongated slot 222 in the back of housing 10, so that when screw 221 is loosened, strip 215 may be adjusted in the direction of its own length with respect to housing 10. Strip 215 is also provided with upper and lower longitudinal grooves 223 and 224 arranged to cooperate with pins 225 and 226 projecting through the back of housing 10 to insure that movement of the strip, when screw 221 is loosened, is in the desired direction.

Resistance assembly 202, which cooperates with slider 163 of carriage 171 and sliders 184 and 185 of carriage 70, remains for description. This unit, as best shown in Figure 5, includes a strip 230 of insulating material fastened to an upper mounting bracket 231 and a lower mounting bracket 232. Upper mounting bracket 231 is arranged to threadedly receive an adjusting screw 237, and lower bracket 232 is arranged to pass a pair of guide screws 235 to compress a pair of springs 236. As best shown in Figure 4, strip 230 is internally cut away over most of its length, and its two ends are channeled to receive and support a resistor 233 and a collector strip 234. When the indicator is assembled collector strip 234 is mounted for engagement by contacts 184, and resistor 233 is arranged for engagement on both sides by contacts 163 and 185 respectively. Collector strip 234 of resistance unit 196 completes this portion of the apparatus, except that it should be noted that the winding of resistor 233 carries an intermediate tap 299 and hence differs from the other windings in the indicator.

For purposes of simplicity of disclosure the various electrical conductors making connection to the windings and sliders in the indicator have not been shown in the drawing. These conductors are carried from multiple pin connector 31 through apertures at 240 and 241 into gear cases 12 and 13, and thence through apertures 242, 243, and 244, and 245, 246 and 247, into the main housing of the indicator, where they are connected as will become more apparent from a study of Figure 6, to which reference should now be made.

Figure 6:
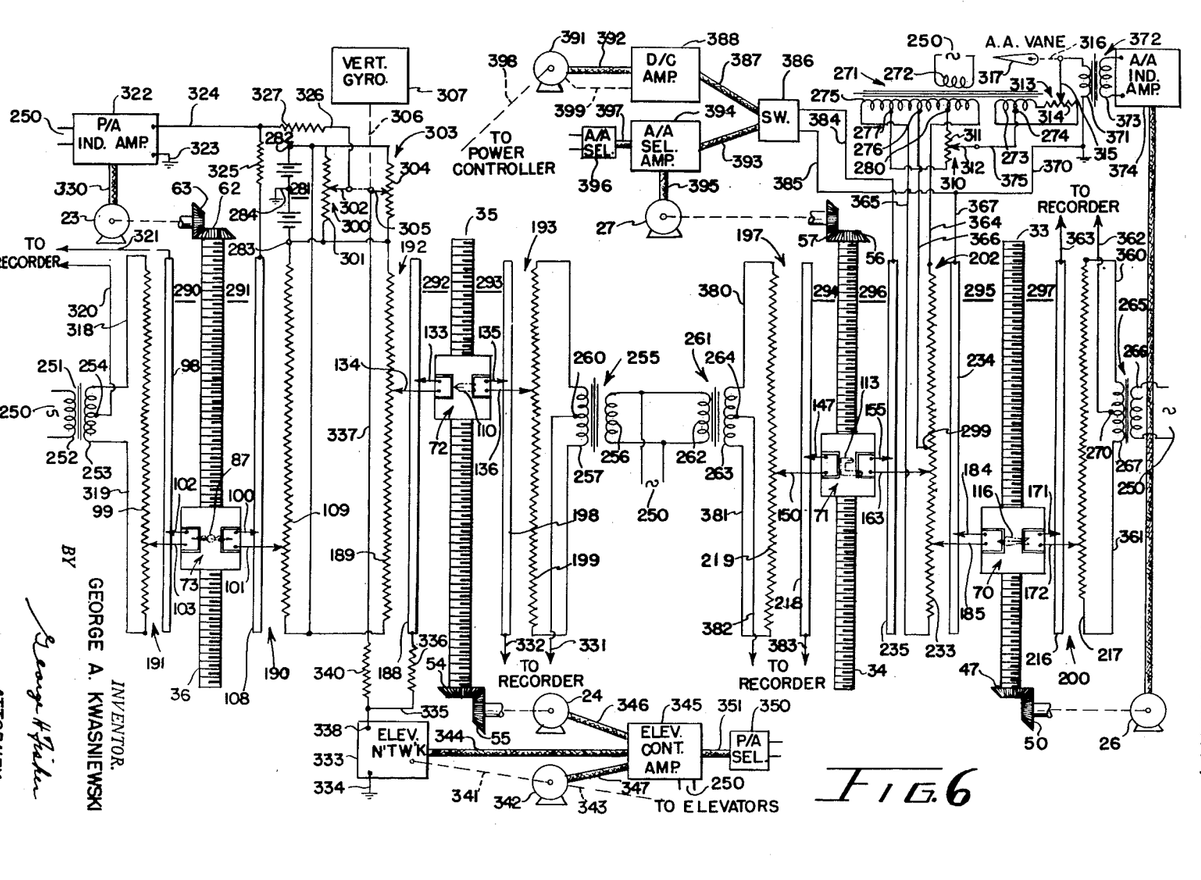
Figure 6 is a schematic showing of my indicator installed in an aircraft control system.

For the sake of simplicity, only two sets of voltage dividers are shown associated with each jackscrew, and all unnecessary structural details have been eliminated. Figure 6 shows the electrical functioning of the apparatus in controlling and recording, while Figure 1 shows the function of the apparatus merely as an indicator.

In Figure 6 a source 250 of alternating voltage is shown as energizing the primary windings of a plurality of transformers. Thus, transformer 251 has a primary winding 252 and a secondary winding 253 center tapped at 254; transformer 255 comprises a primary winding 256 and a secondary winding 257 center tapped at 260; transformer 261 comprises a primary winding 262 and a secondary winding 263 center tapped at 264; transformer 265 comprises a primary winding 266 and a secondary winding 267 center tapped at 270; and transformer 271 comprises a primary winding 272, a first secondary winding 273 center tapped at 274, and a second secondary winding 275 center tapped at 276 and provided with a pair of further taps 277 and 280 equally spaced from center tap 276.

In addition to the alternating source 250, the apparatus further includes a source 281 of unidirectional voltage having a positive terminal 282, a negative terminal 283, and an intermediate grounded terminal 284.

A plurality of linear voltage dividers are shown in Figure 6. Thus collector strip 98, resistance winding 99, and contacts 102 and 103 cooperate to make up a voltage divider 290. Collector strip 108, resistance winding 109, and contacts 100 and 101 cooperate to make up a voltage divider 291. Collector strip 188, resistance winding 189, and contacts 133 and 134 cooperate to make up a voltage divider 292. Collector strip 198 and resistance winding 199 cooperate with contacts 135 and 136 to make up a voltage divider 293. Collector strip 218 and winding 219 cooperate with contacts 147 and 150 to make up a voltage divider 294. Collector strip 234 and resistance winding 233 cooperate with contacts 184 and 185 to make up a voltage divider 295. Collector strip 235 and winding 233 cooperate with contacts 155 and 163 to make up a voltage divider 296. Collector strip 216 and resistance winding 217 cooperate with contacts 171 and 172 to make up a voltage divider 297.

Further voltage dividers incorporated in the system include voltage divider 300 having a winding 301 and a slider 302 and voltage divider 303 having a winding 304 and a slider 305. The sliders of these voltage dividers are actuated simultaneously through a mechanical connection 306 by a vertical gyroscope 307. Also included in the apparatus are a voltage divider 310, which includes a winding 311 and a slider 312, and a voltage divider 313, which includes a winding 314 and a slider 315: these voltage dividers are associated with transformer 271 in the upper righthand portion of the figure. Slider 314 of voltage divider 313 is actuated through a mechanical connection 316 by an attack angle responsive vane 317, and slider 312 is manually adjustable.

Winding 99 of voltage divider 290 is energized from secondary winding 253 of transformer 251 through conductors 318 and 319, and the voltage appearing between center tap 254 of the transformer and slider 103 is proportional to the displacement of carriage 73 along jackscrew 36. This voltage is supplied to a recorder or some other utilization device through conductors 320 and 321, collector strip 98, and slider 102.

Winding 109 of voltage divider 291 is energized from source 281 of unidirectional voltage, so that potential between slider 101 and ground connection 284 is a measure of the displacement of carriage 73 along jackscrew 36. This voltage is impressed upon the input of a pitch attitude indicator amplifier 322 through ground connection 323 and conductor 324, summing resistor 325, collector strip 108, and slider 100.

Winding 301 of voltage divider 302 is also energized from unidirectional source 284, and the voltage between slider 302 and ground is determined by the vertical gyroscope 307. This voltage is also impressed on amplifier 322 through ground connections 323 and 281 and conductor 324, summing resistor 327, and conductor 326.

Pitch attitude indicator amplifier 322 energizes motor 23 through a suitable cable 330. The arrangement is a conventional one in which a motor 23 is caused to operate in a first direction when a voltage of a first polarity is impressed on the input of amplifier 322, and is caused to operate in the opposite direction when a voltage of the opposite polarity is impressed on the input to the amplifier. The latter may contain means for converting the polarity-reversing D. C. signal into a phase-reversing A. C. signal, and to this end is shown as being energized from source 250. This arrangement is shown in more detail and discussed more completely in the copending application of Ross C. Alderson, Serial No. 206,579, filed January 18, 1951, and assigned to the assignee of the present application.

Winding 199 is energized from secondary winding 257 of transformer 255, and accordingly the voltage appearing between slider 136 and center tap 260 is a measure of the position of carriage 72 along the jackscrew 35. This voltage is supplied to a recorder or other utilization device through conductors 331 and 332, collector strip 198, and slider 135.

Winding 189 is energized from source 281, and the voltage between slider 134 and ground connection 284 is also a measure of displacement of carriage 72 along jackscrew 35. This voltage is impressed upon the input of an elevator network 333 through ground connections 284 and 334 and conductor 335 and summing resistor 336.

Winding 304 of voltage divider 303 is also energized from unidirectional source 281, and the voltage between slider 305 and ground connection 284 is determined by vertical gyroscope 307. This voltage is also impressed on elevator network 333 through ground connections 284 and 334, and through conductor 337, summing resistor 340, and input terminal 338.

The block labeled "elevator network" in Figure 6 is intended to represent means for supplying all other signals considered desirable in controlling the elevators of an aircraft, and for combining them with signals supplied through summing resistors 336 and 340, all as shown more completely in the copending application above referred to. Where such requirements are not necessary, network 333 may be simplified to the point where it comprises simply a voltage divider having a winding energized from source 281 and a slider connected through a suitable summing resistor to terminal 338, and being actuated through a mechanical connection 341 by a servomotor 342, which also actuates the elevators of the craft through a releasable mechanical connection 343.

The total elevator signal is supplied by network 333 through a suitable cable 344 to an elevator control amplifier 345. This amplifier includes means for supplying the output thereof either through a first cable 346 to pitch attitude selector motor 24, or through a second cable 347 to elevator servomotor 342. There is also shown a pitch attitude selector 350 connected to amplifier 345 through a cable 351, and effective to cause operation of motor 24 regardless of whether the output from amplifier 345 is being supplied to motor 24 or to motor 342. The details of this apparatus comprises no portion of the present invention, and are shown in complete detail in the copending application referred to above.

When it is desired to set the pitch attitude components of the indicator in operation, vertical gyroscope 307 is disconnected from sliders 302 and 305, and the sliders are set at the centers of their winding. Jackscrews 36 and 35 are then operated until cariages 73 and 72 are at their central positions along the jackscrews when indexes 87 and 110 are at the plus 5 graduation on scale plate 91, and amplifiers 322 and 345 are disconnected from source 250. The position of winding 109 in housing 10 is then adjusted by means of the upper adjusting screw until no output voltage appears between conductor 324 and ground, and the position of winding 189 in housing 10 is adjusted by means of the upper adjusting screw until no voltage appears at the input to elevator network 333. When these adjustments have been completed, the vertical gyroscope may be adjusted to the plus 5° pitch attitude position, mechanical connection 306 to sliders 302 and 305 may be completed, and amplifiers 322 and 345 may be energized. To complete the adjustment of this portion of the apparatus, windings 99 and 199 are adjusted in housing 10 until no voltages appear on the recorder output conductors. The pitch attitude portion of the apparatus is now in condition for final adjustment.

Turning now to the attack angle portion of the apparatus, winding 217 of voltage divider 297 is energized from secondary winding 267 of transformer 265 through conductors 360 and 361, and accordingly the voltage between slider 172 and center tap 270 is a measure of the position of carriage 70 along jackscrew 33. This voltage is supplied to a recorder or other utilization device through conductors 362 and 363, collector strip 216, and slider 171.

Winding 219 of voltage divider 197 is energized from secondary winding 263 of transformer 216 through conductors 380 and 381, so that the voltage between center tap 264 of the secondary winding and slider 150 is a measure of the position of carriage 71 along jackscrew 34. This voltage is supplied to a recorder or other utilization device through conductors 382 and 383, collector strip 218 and slider 147.

Winding 233 of voltage dividers 295 and 296 is energized from secondary winding 275 of transformer 271 through conductors 364 and 365; a further conductor 366 connects center tap 299 on winding 233 with center tap 276 on winding 275, for impedance reducing purposes, as is well known in the art. Slider 185 is connected through slider 184, collector strip 234, and conductors 367 and 370 to the grounded terminal of primary winding 371 of an isolation transformer 372 whose secondary winding 373 is connected to energize an attack angle indicator amplifier 374. In addition to a voltage determined by the position of slider 185, the circuit to primary winding 371 includes a centering voltage and an attack angle responsive voltage, supplied as follows.

Winding 311 of voltage divider 310 is energized from taps 277 and 280 of secondary winding 275, and winding 314 of voltage divider 313 is energized from secondary winding 273 of transformer 271. Slider 312 of voltage divider 310 is connected by conductor 375 to center tap 274 of secondary winding 273, and slider 315 of voltage divider 313 is connected to the ungrounded terminal of primary winding 371. When slider 312 is at the center of winding 311, there is no voltage difference between the slider and center tap 276, and when slider 315 is at the center of winding 314, there is no voltage difference between the slider and center tap 274. If under these conditions slider 185 is at the center of winding 233, no voltage is applied to the primary of transformer 372, amplifier 374 accordingly has no input voltage, and motor 26 remains inoperative.

Collector strips 235 and 234 are connected by conductor 384 and by conductors 385 and 367 to a switching device 386, whose function is to supply this voltage either through a first cable 387 to a power control amplifier 388 which energizes a power servo 391 through a cable 392, or through a second cable 393 to an attack angle selector amplifier 394 which energizes motor 27 through a suitable cable 395. Power servo 391 is connected to the power controller of the craft through a suitable mechanical connection 398, and to power control amplifier 388 by mechanical connection 399. An attack angle selector 396 is also shown as controlling the operation of amplifier 394 through a cable 397.

It will be evident from a study of Figure 6 that while amplifier 374 is energized in accordance with the departure of slider 185 from the center tap 296 on winding 233, the voltage supplied to switch 386 is not measured with respect to center tap 296, but measures only the difference in potential between sliders 185 and 163.

A detailed disclosure of power control system with which the present indicator is adapted for use is shown in the copending application of Ross C. Alderson, Serial No. 206,578, filed January 18, 1951, and assigned to the assignee of the present application.

When it is desired to set this portion of the apparatus into operation, initially, vane 317 and motors 26, 27 and 391 are disconnected from the members which they ordinarily drive. Sliders 312 and 314 of voltage dividers 310 and 313 are set at the centers of their windings, and the gibs on carriages 71 and 70 are set at the centers of their travel. Jackscrews 33 and 34 are now adjusted so that indexes 113 and 116 are both at the plus 5° graduation on scale 92. Windings 217 and 209 are now adjusted longitudinally of housing 10 until the recorder outputs are reduced to zero, as has been previously described. Winding 233 is next adjusted so that no voltage appears across conductors 384 and 385. In the unlikely case of mechanical perfection of construction and assembly, no further adjustment of the apparatus will be necessary.

In the usual case, however, there will be a residual voltage appearing across primary winding 371 of transformer 372, and the gib of carriage 70 must now be adjusted to reduce this voltage to zero. If this cannot be accomplished by maximum adjustment of the gib on carriage 70, the position of winding 233 may be adjusted in the opposite direction, and if the voltage on primary winding 371 can thus be reduced to zero, the gib on carriage 71 must thereafter be readjusted so that the voltage on conductors 384 and 385 is again made zero.

In unusual cases of dissymmetry of construction or manufacture, it may be found that even by adjusting the position of both the gibs and of winding 233, it is not possible to reduce the voltages on conductors 384 and on primary winding 371 to zero at the same time. If this situation arises, the voltage on conductors 384 and 385 is made zero as previously described, and then slider 312 is displaced from its central position to supply a voltage in series with the voltage from slider 185, of the same magnitude of that voltage and of opposite phase, so that the two voltages add to get a resultant voltage on the transformer primary of zero. When the adjustments just decribed have been made, motors 27 and 26 may be connected to their respective jackscrews, and vane 317 may be set to its plus 5° condition and coupled to slider 315.

The attack angle portion of the apparatus is now ready for final adjustment.

The final adjustment of the complete apparatus must be made when the craft is in flight. The craft is merely brought into a condition of uniform flight at a constant pitch attitude and a constant attack angle, by proper manipulation of the control stick and power control levers of the aircraft. Slider 101 is adjusted on winding 99 by motor 23 in accordance with the actual pitch attitude of the craft as sensed by gyroscope 307. The output of elevator control amplifier 345 is supplied to motor 24, so that the motor adjusts slider 134 to the same position on winding 189 as slider 101 has on winding 109. Slider 185 is adjusted on winding 233 by motor 26 in accordance with the actual attack angle of the craft as sensed by vane 317. Switch 386 is set to energize amplifier 394, so that motor 27 adjusts slider 163 to the same position on winding 233 as slider 185 has taken. When this condition has been achieved, mechanical connection 343 between motor 342 and the elevators of the craft, and mechanical connection 398 between motor 391 and the power controls of the craft, are completed. At the same time the output of amplifier 345 is supplied to motor 342 instead of to motor 24, and switch 386 is operated to energize amplifier 388 instead of amplifier 394. These changes are preferably made by electrically actuated clutches and relays which are at all times under the control of the human pilot. The apparatus as a whole is now in full operation.

In order to prevent travel of the carriages beyond desired limiting positions at each end of their jackscrews, stop means have been provided. These stop means are all the same, and that for carriage 73 is typical. As is shown in Figures 3 and 5, the stop means includes a collar collar 400 fastened to guide rod 80 by a set screw 401. To prevent mechanical shock upon engagement of carrier 73 with collar 400, a novel bumper is provided in the form of a short section of rubber tubing 402 diametrically pierced by guide rod 80. By this means a gradually increasing resistance to movement of carriage 73 along jackscrew 33 is provided, which ultimately becomes sufficient to cause slipping of clutch 53.

Operation

The end result of the adjusting process just described is that motors 23, 24, 27, 26, 342 and 391 are deenergized. Indexes 87 and 110 are at the same position on pitch attitude scale 91, and indexes 113 and 116 are at the same position on attack angle scale 92. Recorder voltages are being supplied in proportion to the magnitudes of the actual and selected pitch attitude and attack angle, sliders 302 and 305 are stabilized in their positions with respect to their windings by gyroscope 307, and slider 315 is maintained in its position on winding 314 by vane 317. Motor 24 is uninfluenced by any voltage supplied from elevator network 333, but may adjusted by pitch attitude selector 350. Similarly motor 27 is not unaffected by any voltage applied to switch 386, but may be adjusted by attack angle selector 396.

Now suppose that for some reason the pitch attitude of the aircraft changes. This change is sensed by vertical gyroscope 307, and sliders 302 and 305 are displaced along their windings. Movement of slider 392 results in a change in the voltage supplied to amplifier 322 through summing resistor 327, so that this voltage is no longer equal to that supplied through summing resistor 325, and motor 23 is energized, adjusting carriage 73 by operation of jackscrew 36 so that the positions of contacts 103 and 101 with respect to their windings are changed. This results in a different voltage being supplied to the recorder through conductors 320 and 321, and also results in a change of the voltage supplied through summing resistor 325 to amplifier 322. When this voltage has been changed to once more be equal to the voltage supplied through summing resistor 327, enregization of motor 23 is once more interrupted, and index 87 now gives the new pitch attitude of the aircraft.

Displacement of slider 305 along winding 304 changes the voltage applied to elevator network 333 through summing resistor 340, so that it is no longer equal to that supplied through summing resistor 336, and a voltage is supplied through cable 344 to amplifier 345 and hence through cable 347 to elevator servomotor 342, thus causing adjustment of the elevators of the craft and simultaneous readjustment of network 333 by mechanical connection 341. As the elevators are adjusted, the pitch attitude deviation of the craft is reduced, and this change also is sensed by vertical gyroscope 307. The elevator network 333 ultimately resumes a stable condition, its output becoming zero when slider 305 has been restored to its former position on winding 304, and motor 342 is deenergized. It will be appreciated that during this procedure slider 302 is also adjusted, and motor 23 is accordingly enregized to maintain index 87 always at the position on scale 91 corresponding to the instantaneous pitch attitude of the craft.

The foregoing operation is descriptive of the indicating and correcting functions which take place during a temporary deviation of the craft from its desired pitch attitude. It is possible however that the human pilot may wish to cause the craft to permanently assume a new pitch attitude. When this situation arises, the human pilot operates pitch attitude selector 350, energizing motor 24 and causing displacement of contacts 134 and 136 with respect to their windings. At the same time index 110 is displaced with respect to pitch attitude scale 91, until the new value of selected pitch attitude has been reached. When this makes place, the human pilot discontinues operation of pitch attitude selector 350, and motor 24 is deenergized.

The result of this operation is that the voltage supplied to elevator network 333 through summing resistor 336 is no longer equal to that supplied through resistor 340, and network 333 energizes amplifier 345 which in turn causes operation of motor 342. A new rebalancing voltage is supplied to elevator network 333, and the position of the elevators is also changed, resulting in a change in the pitch attitude of the craft which is sensed by vertical gyroscope 307 as before. The voltage supplied through summing resistor 340 now begins to change and when it once more becomes equal and opposite to the voltage supplied through summing resistor 336, the elevator control apparatus is once more in its previous condition, and the craft is in stable flight in the new pitch attitude. Operation of vertical gyroscope 307 causes readjustment of index 87 through amplifier 322 and motor 23 as previously described.

Returning once more to the condition of the craft in which it is in flight at the desired pitch attitude and attack angle, let it now be assumed that for some reason the attack angle of the craft changes. This change is sensed by vane 317, and slider 315 is displaced along winding 314, so that a change takes place in the voltage between the slider and the center tap 274. This means that the total voltage on primary winding 371 of transformer 372 is no longer what it was before, and amplifier 374 energizes motor 26 to adjust carriage 70 by means of jackscrew 33. Index 116 is moved to a new position on attack angle scale 92, and contacts 185 and 172 are displaced with respect to windings 233 and 217. The latter contact displacement results in a change in the recorder voltage supplied on conductors 362 and 363, and the former change has two effects. The first of these effects is a change in the voltage added to that controlled by vane 317 in the primary winding of transformer 372, the change being opposite in sense to that resulting from the operation of vane 317, so that the voltage supply to amplifier 372 is reduced to zero. When this takes place, operation of motor 26 is interrupted.

The second effect of adjustment of contact 185 with respect to winding 233 is a change in the voltage appearing on conductors 384 and 385, and hence a change in the energization of amplifier 388. Motor 391 is accordingly energized, changing the power setting of the craft and also changing the rebalance signal supplied in amplifier 388, so that a new position of power control results. The new power setting causes a change in the attack angle of the craft, this change is sensed by vane 317 and an opposite voltage is supplied to amplifier 374 resulting in opposite energization of motor 26 and opposite displacement of carriage 70 along jackshaft 33. The apparatus once more assumes a stable condition in which contact 185 is aligned with contact 163, and the craft is once more at the desired attack angle.

If the human pilot desires to assume a new attack angle permanently, he operates attack angle selector 396 which energizes motor 27 independently of any voltage supplied from switch 386. Contacts 150 and 163 and index 113 are displaced with respect to windings 219 and 233 and scale 92 respectively, thus changing the recorder voltage appearing on conductors 382 and 383 and energizin" power control motor 391 as has just been described. This operation of the power controller continues until the human pilot ceases to operate selector 396.

Operation of the power controller results in a change in the attack angle of the craft which is sensed by vane 317 to cause operation of motor 26 as just described. This operation of the motor continues until contact 185 is once more in alignment with contact 163, that is, until indexes 113 and 116 are aligned, and operation of motors 26 and 391 takes place as previously described until the apparatus assumes a new stable condition in which the craft is in flight at the selected attack angle.

Thus far, the operation of the pitch attitude control apparatus and the attack angle controls apparatus has been given separately as though they were independent. This form of presentation has been used for simplicity and initial description, but it does not represent the actual condition, which is more complicated. As is well known by aerodynamicists, any change in the pitch attitude of the craft results in a change in its attack angle, unless corrective adjustment of the power control is simultaneously made, and conversely any adjustment of the power control of the craft results in a change not only in attack angle, but also in pitch attitude. Thus, in the absence of pitch attitude control apparatus, control of the power of the craft would still result in indeterminate control of the attack angle, and in the absence of control of the attack angle of the craft, adjustment of the elevators would result in indeterminate control of pitch attitude of the craft. A principal portion of the activities of a human pilot in manually controlling an aircraft consists in coordinating the pitch attitude and the attack angle of the craft by operation of the control stick and power control lever, to give a desired airspeed and rate of climb, which can be controlled only indirectly through attack angle and pitch attitude. The interrelationships between these variables are given in further detail in the second copending application referred to above, and are mentioned here only to emphasize the actual interdependence of the two principal subcomponents of the apparatus.

Numerous objects and advantages of my invention have been set forth in the foregoing description, together with details of the structure and function of the invention, and the novel features thereof are pointed out in the appended claims. The disclosure however is illustrated only, and I may make changes in detail, within the principle of the invention, to the full extent indicated by the broad general meaning of the terms of which the appended claims are expressed.

I claim as my invention:

1. In an indicator, in combination: a housing; a scale plate carried by said housing and having a pair of spaced aligned slots and an external scale aligned therewith and located therebetween; an index carrier extending through each of said slots; indexes mounted on the outer ends of said carrier and extending toward said scale; means within said housing for mechanically displacing said carriers along said slots so that each index can travel from one end of said scale to the other end thereof regardless of the position of the other index; an elongated resistance element shaped for alignment with said slots; an elongated member shaped for alignment with said element in supporting relation to the ends thereof to expose a first portion of the surface of said element throughout a major portion of its length, said member having an elongated aperture arranged to expose a second portion of the surface of said element throughout a major portion of its length, means supporting said member in said housing so as to align said member with said slots, including resilient means and adjusting means acting oppositely on opposite ends of said member to displace said member in the direction of its length; first and second contacting means movable along said element in continuous electrical contact with said first and second portions thereof; means severally mounting said contacting means on said carriers for movement unitary with said indexes; and means for making electrical connection with said element and said contacting means.

2. In an indicator in combination: a housing; a scale plate fixed to said housing and having a pair of spaced aligned slots and an external scale aligned therewith and located therebetween; index carriers extending through said slots; indexes mounted on the outer ends of said carriers and extending toward said scale; means within said housing for mechanically displacing said carriers along said slots so that each index can travel from one end of said scale to the other end thereof regardless of the position of the other index; a pair of elongated resistance elements shaped for alignment with said slots; means mounting said elements behind said plate in alignment with said slots, including means operable to adjust the position of at least one of said elements in the direction of its length; means severally movable along said elements in continuous electrical connection therewith; means mounting each of said contacting means on one of said carriers for movement unitary with said indexes; a further elongated resistance element; an elongated member shaped for alignment with said element in supporting relation to the ends thereof to expose a first portion of the surface of said element throughout a major portion of its extent, said member having an elongated aperture arranged to expose a second portion of said element throughout a major portion of its length; means supporting said member within said housing so as to align said further element with said slots, including resilient means and adjusting means acting oppositely on opposite ends of said member to displace said member in the direction of its length; first and second further contacting means movable along said further element in continuous electrical connection with said first and second portions thereof; means mounting said further contacting means on said carriers for movement unitary with said indexes and with the first named contacting means, including adjusting means operable to cause displacement between at least one of said further contact means and the carrier on which it is mounted in the direction of said slots; and means for making electrical connection with said elements and said contact means.

References Cited in the file of this patent

UNITED STATES PATENTS

| | | |
|---|---|---|
| 155,659 | McCourt | Oct. 6, 1874 |
| 827,182 | Rittmeyer | July 31, 1906 |
| 829,368 | Clarke | Aug. 21, 1906 |
| 1,543,061 | Danielson | June 23, 1925 |
| 1,757,971 | McKibben | May 13, 1930 |
| 1,859,750 | Pratt | May 24, 1932 |
| 2,056,490 | Skaraas et al. | Oct. 6, 1936 |
| 2,232,537 | Kollsman | Feb. 18, 1941 |
| 2,292,451 | Koster | Aug. 11, 1942 |
| 2,311,375 | Farwick | Feb. 16, 1943 |
| 2,363,132 | Lightfoot et al. | Nov. 21, 1944 |
| 2,467,412 | Wathen | Apr. 19, 1949 |

OTHER REFERENCES

Aircraft Engineering, Oct. 1944, pp. 288–289, "An Italian Artificial Horizon," by Postlethwaite.